May 11, 1965  G. R. CLARK  3,182,934
AIRCRAFT LANDING GEAR WHEEL SAFETY DEVICE
Filed Oct. 4, 1963
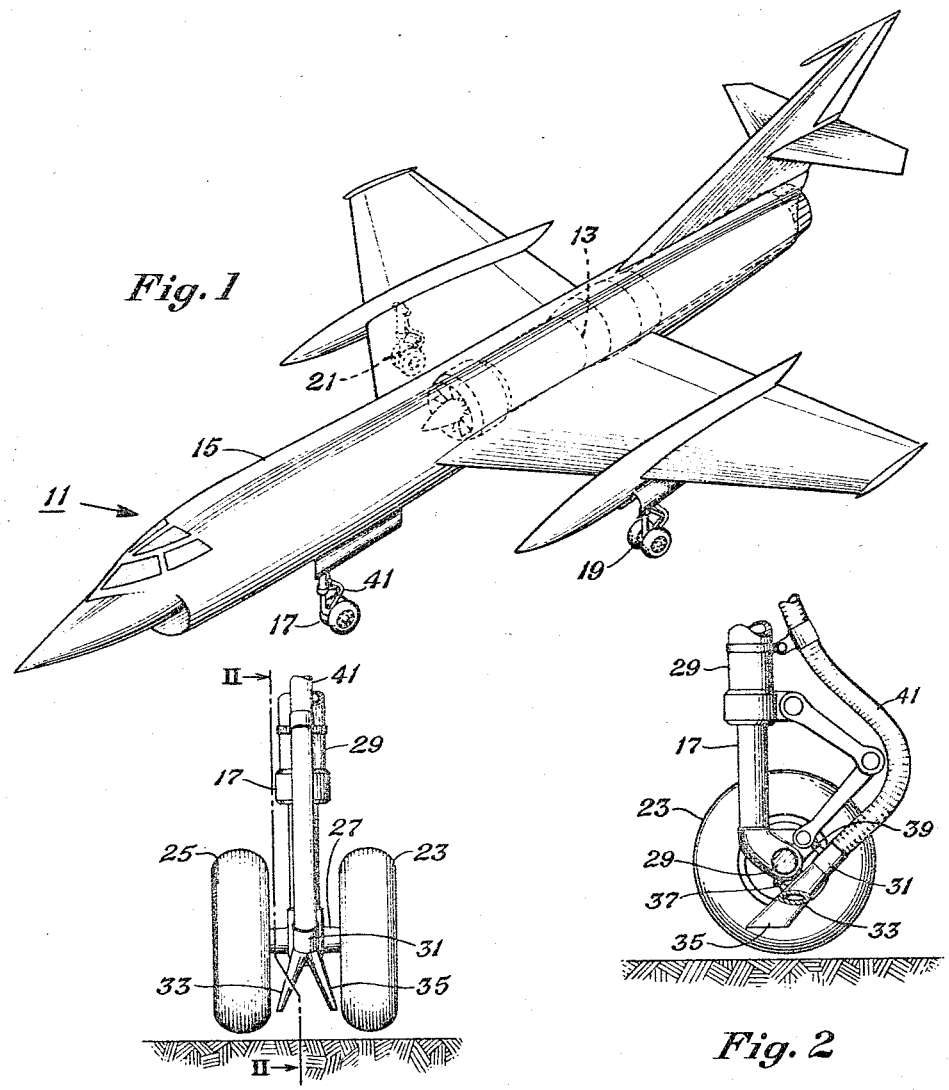
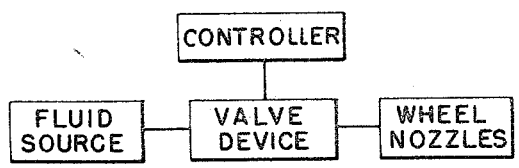
INVENTOR.
George R. Clark
BY Wm. T. Wofford
Attorney

United States Patent Office 3,182,934
Patented May 11, 1965

3,182,934
AIRCRAFT LANDING GEAR WHEEL
SAFETY DEVICE
George R. Clark, 7724 Gaston Ave., Fort Worth, Tex.
Filed Oct. 4, 1963, Ser. No. 313,857
3 Claims. (Cl. 244—103)

My invention relates to wheeled vehicle safety devices and is particularly applicable to aircraft and useful during takeoff and landing of aircraft from a runway surface.

When an aircraft either lands on or takes off from a runway surface that is contaminated with large quantities of fluid or fluid-like substances, for example, water or slush, a condition may often occur which is known as tire hydroskiing or tire hydroplaning. Tire hydroskiing or tire hydroplaning is characterized by an accumulation of the contaminant between the tire and the runway surface to such an extent that the entire aircraft is supported by the contaminant and all effective frictional contact with the runway surface is lost.

Tire hydroskiing is apt to occur during landing when the horizontal speed of the aircraft is considerably greater than the downward or vertical speed. Tire hydroskiing can cause serious operational problems. For one thing, it can cause reduction in tire braking traction to the point where it is almost insignificant. Also, since there is no effective frictional traction between the tires and the runway, the aircraft has almost no ground directional stability. Thus, both as to braking and directional stability, effective control by the pilot is lost. It will be recognized of course, that the performance of the aircraft during takeoff may be adversely affected in a similar manner.

The general object of the present invention is to provide a simple and effective apparatus designed to prevent tire hydroskiing of aircraft.

Another object of the invention is to provide an aircraft anti-hydroskiing device which may effectively use a source of power that is available in an aircraft engine prime mover.

Another object of the invention is to provide an aircraft tire anti-hydroskiing device that is readily and easily controllable by the pilot at will.

In accordance with the principles of my invention, an aircraft tire anti-hydroskiing device includes a nozzle or nozzles mounted adjacent an aircraft wheel and tire assembly or assemblies, such nozzle or nozzles being connected to a controlled source of fluid under pressure and being directed toward the region of the runway surface in front of such wheel and tire assembly or assemblies. A controller and valve device are provided to regulate the flow of such pressurized fluid during landing and takeoff, at the will of the aircraft pilot.

For a further understanding of the invention, and further objects, features, and advantages thereof, reference may now be had to the following description taken in conjunction with the accompanying drawing in which:

FIG. 1 is a schematic perspective view of an aircraft on the landing gear of which a tire anti-hydroskiing device in accordance with the principles of the present invention is installed;

FIG. 2 is a sectional view taken along line II—II of FIG. 3 which is a schematic rear elevational view of a typical landing gear arrangement; and FIG. 4 is a schematic diagram of the fluid flow system in accordance with a preferred embodiment of my invention.

Referring to the drawing, FIG. 1 illustrates a typical jet type aircraft 11 having a single jet engine 13 within a fuselage and wing structure 15. The aircraft is supported, when on the ground or other support surface, by a tricycle landing wheel arrangement comprising a nose wheel assembly 17, and side wheel assemblies 19, 21.

FIGS. 2 and 3 illustrate a conventional type of landing gear arrangement and it may be assumed for the purpose of this description that it depicts the nose wheel assembly 17. The landing gear includes a pair of spaced apart landing wheel-tire assemblies 23, 25 suitably mounted on an axle 27 which is carried by a landing gear strut mechanism 29.

A bifurcated nozzle 30 having outlet tubes 33, 35 is mounted between the wheel-tire assemblies 23, 25 to the strut mechanism structure 29 by means of suitable fasteners 37, 39. The nozzle outlet tubes 33, 35 are directed both forwardly and downwardly, but they are directed outwardly in opposite directions as may be noticed by referring to FIG. 3. The nozzle outlet tubes 33, 35 are preferably shaped to discharge fluid at a relatively high velocity and pressure. A length of flexible hose or tubing 41 is connected to the bifurcated nozzle 31 and to a suitable source of high pressure fluid. One such source of high pressure fluid is the jet engine 13. A desirable connection to the jet engine may be made in the compressor region 43 thereof. A suitable valve device (see FIG. 4) is installed in the flexible hose 41, while a suitable controller for the valve device is installed in a convenient location in the aircraft 11. A preferred source of fluid is the high compression stages of the jet engine turbine compressor. However, it is to be understood, that an auxiliary turbine fluid compressor or any other suitable source of compressed fluid, which is aboard the aircraft, may be utilized if preferred.

Now, to understand the use of the tire anti-hydroskiing device of the present invention, reference may be made to FIGS. 2 and 3. It may be assumed that the aircraft 11 of FIG. 1 is about to land on a runway that is thoroughly contaminated with some substance such as water, slush, oil, foam, mud, or the like substances. The aircraft 11 then will be traveling in a practically horizontal direction and descending vertically at a rate of speed that is small compared to the forward speed. When the landing wheels are close to the runway surface, or about where shown relatively in FIGS. 2 and 3, the controller may be moved to open the valve device so that compressed fluid from the fluid source will flow via the valve device and the hose 41 to the bifurcated wheel nozzles 31, as indicated in the diagram of FIG. 4. The fluid, upon emerging from the outlet tubes 33, 35 at relatively high pressure and velocity, impinges upon the contaminant on the runway surface and tends to break up the contaminant into particulate matter. Next, the emerging fluid tends to keep the particulate matter in a state of agitation so that the contaminant particles will not coalesce and establish the tire hydroskiing condition. Later, when the aircraft has touched down and its forward velocity is slower, the emerging fluid will tend to clean the runway surface immediately in front of the tire so that the tire will grip the runway surface as if it were a clear and dry surface. Thereafter, when the aircraft has been slowed sufficiently, the controller may be moved again to close the valve device and shut off the flow of fluid to the wheel nozzles.

During take-off, the fluid flow displaces and clears the contaminant from the runway immediately in front of the tire, thus allowing the aircraft to accelerate with significantly less effort than would be required if no fluid were used. Moreover, as the aircraft approaches lifting speed on takeoff, the fluid flow acts in the same manner and for the same purpose as when landing, namely, to prevent tire hydroskiing. After the aircraft has become air-borne, the controller may be moved to close the valve device and shut off the flow of fluid in the hose 41.

It is to be understood that the devices of my invention are applicable to all types of aircraft regardless of the type or number of engines, type of landing gear, and size of aircraft. It is only necessary in each case that fluid nozzles be suitably installed to act with enough wheels to enable the pilot to maintain control. Either a single nozzle or multiple nozzles per aircraft wheel may be utilized within the scope of the invention.

The foregoing disclosure and the showing made in the drawing are merely illustrative of the principles of this invention and are not to be interpreted in a limiting sense.

I claim:

1. In aircraft having landing gear including wheels and tires, a system for use in preventing tire hydroskiing during landing and take-off from a runway surface, such system comprising:
    (a) a source of compressed air;
    (b) conduit means having discharge means mounted adjacent a said landing wheel and disposed to direct flow of said compressed air downwards and toward the region just above said runway surface and immediately ahead of said landing wheel tire;
    (c) means connecting said compressed air source and said conduit means; and
    (d) means for regulating and controlling the flow of compressed air in said conduit means.

2. In aircraft having landing gear including wheels and tires, a system for use in preventing tire hydroskiing during landing and take-off from a runway surface, such system comprising:
    (a) a source of compressed gas in the form of a compressor stage of a jet engine;
    (b) conduit means having discharge means mounted adjacent a said landing wheel and disposed to direct flow of said compressed gas downwards and toward the region just above said runway surface and immediately ahead of said landing wheel tire;
    (c) means connecting said source and said conduit means; and
    (d) means for regulating and controlling the flow of compressed gas in said conduit means.

3. In aircraft having landing gear including wheels and tires, a system for use in preventing tire hydroskiing during landing and take-off from a runway surface, such system comprising:
    (a) a source of compressed gas under pressure;
    (b) conduit means having discharge means mounted adjacent a said landing wheel and disposed to direct flow of said compressed gas downwards and toward the region just above said runway surface and immediately ahead of said landing wheel tire;
    (c) means connecting said source and said conduit means; and
    (d) means for regulating and controlling the flow of compressed gas in said conduit means.

References Cited by the Examiner

UNITED STATES PATENTS

| 2,664,256 | 12/53 | Winterringer | 244—103 |
| 2,677,516 | 5/54 | Pilling | 244—103 |

FOREIGN PATENTS

| 848,417 | 6/62 | Great Britain. |

FERGUS S. MIDDLETON, *Primary Examiner.*

ANDREW H. FARRELL, MILTON BUCHLER,
*Examiners.*